(12) United States Patent
Hetzenecker et al.

(10) Patent No.: US 7,516,809 B2
(45) Date of Patent: Apr. 14, 2009

(54) SYSTEM AND METHOD FOR OCCUPANT DETECTION AND CLASSIFICATION IN MOTOR VEHICLES

(75) Inventors: Erwin Hetzenecker, Regenstauf (DE); Michael Krempl, Ergoldsbach (DE); Gerhard Wild, Regensburg (DE); Gerd Winkler, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 11/216,996

(22) Filed: Aug. 31, 2005

(65) Prior Publication Data

US 2006/0042852 A1  Mar. 2, 2006

Related U.S. Application Data

(60) Provisional application No. 60/605,973, filed on Aug. 31, 2004.

(51) Int. Cl.
*B60R 21/015* (2006.01)
(52) U.S. Cl. .................. 180/273; 280/735; 374/143
(58) Field of Classification Search ............... 180/271, 180/273; 280/735; 701/36; 374/143, 29, 374/44

See application file for complete search history.

(56) References Cited

U.S. PATENT DOCUMENTS

| 5,987,370 | A * | 11/1999 | Murphy et al. ............... 701/45 |
|---|---|---|---|
| 6,138,067 | A * | 10/2000 | Cobb et al. .................. 701/45 |
| 6,818,842 | B2 * | 11/2004 | Gray et al. ................. 177/144 |
| 6,903,280 | B2 * | 6/2005 | Selig et al. ................. 177/144 |
| 7,026,946 | B2 * | 4/2006 | Saunders et al. ............ 340/666 |
| 7,046,158 | B2 * | 5/2006 | Saunders et al. ............ 340/666 |
| 7,055,365 | B2 * | 6/2006 | Yanagi ....................... 73/1.13 |
| 7,181,324 | B2 * | 2/2007 | Fischer et al. ................ 701/36 |
| 2002/0125417 | A1 * | 9/2002 | Damaschke ................. 250/239 |
| 2004/0243295 | A1 * | 12/2004 | Fischer et al. ................ 701/45 |

* cited by examiner

*Primary Examiner*—Ruth Ilan
*Assistant Examiner*—Drew J. Brown
(74) *Attorney, Agent, or Firm*—Laurence A. Greenberg; Werner H. Stemer; Ralph E. Locher

(57) ABSTRACT

In an occupant detection or classification system for a motor vehicle, a sensor mat (2) measures the pressure or pressure distribution on a seating surface. A control unit (4) receives the signals from the sensor mat (2) representing an occupancy of the vehicle seat. The temperature of the foam core (1) underlying the seating surface is measured at a location other than in the center of the foam core and, specifically, at the control unit (4).

17 Claims, 3 Drawing Sheets

SYSTEM AND METHOD FOR OCCUPANT DETECTION AND CLASSIFICATION IN MOTOR VEHICLES

CROSS-REFERENCE TO RELATED APPLICATION

This application claims the benefit, under 35 U.S.C. § 119(e), of provisional patent application No. 60/605,973, filed Aug. 31, 2004. The prior application is incorporated herein by reference.

BACKGROUND OF THE INVENTION

FIELD OF THE INVENTION

The invention lies in the field of automotive technology and occupant safety and passenger convenience technology. More specifically, the invention pertains to occupant detection and classification in motor vehicles, which provides information concerning the occupancy of vehicle seats by persons or other objects.

Occupant detection and classification systems in motor vehicles are important contributors to motor vehicle safety. The occupant detection system detects whether or not anyone or anything is placed on a seat. The occupant classification system calculates whether a seat is occupied by a child, by an adult, or by another object. Restraint systems can thus be activated as the situation requires and injuries caused by the incorrect firing of airbags can be avoided, as they are optimally adapted to the size and the weight of the passenger. The system includes a sensor mat that is integrated in the seat and a control unit. The sensor mat contains a large number of sensor elements that detect the pressure distribution on the seat.

The response behavior of the sensor mat is temperature-dependent. The primary reason for this is the fact that the foam material underlying the sensor mat exhibits different behavior at different temperatures. That is, a cold seat (cold foam, cold mat) will yield a different measurement result than a warm seat (warm foam, warm mat). It is therefore necessary, in such vehicle occupant safety systems, to measure the temperature in order to properly detect and classify passengers or other objects placed on the seat.

In the prior art, such temperature measurements have been effected either by measuring the temperature in a mat overlying the seat foam or by way of extensive and complicated algorithms.

It is also possible to measure the temperature and the temperature distribution in the foam itself. It is thereby important for the foam temperature measurement that the local temperature of the foam is not measured at only one location, but the entire temperature distribution within the foam. The most ideal scenario would be a temperature measurement of the foam at a multiplicity of locations. This, however, would be very expensive and it would even provide for unnecessary precision. A good approximation is achieved by determining the average temperature of the foam. This, however, is quite unreliable in that it is a localized measurement that is particularly questionable when the measurement point is not exactly in middle of the volume of the foam. Precisely at that location, however, there may occur unusually high heating due to external heating, such as a seat heater, a hot object placed on the seat, solar radiation, a passenger, or an animal.

By way of example, assume that the motor vehicle, and the seat foam, have cooled down to −30° C. A passenger enters the vehicle, sits down on the seat, and heats the foam at exactly that (central) measuring location. The remainder of the foam stays at −30° C. or very close thereto. The resulting temperature measurement would be incorrect, leading to erroneous or inconclusive passenger classification.

SUMMARY OF THE INVENTION

It is accordingly an object of the invention to provide a system and method for temperature measurement in automobile seats, which overcomes the above-mentioned disadvantages of the heretofore-known devices and methods of this general type and which improves the accuracy of the measurement and the robustness of the system, while providing for a cost-saving and economically feasible solution.

With the foregoing and other objects in view there is provided, in accordance with the invention, an occupant detection/classification system for a vehicle seat, comprising:

a sensor mat disposed on, in, or underneath a foam core of the vehicle seat;

a control unit connected to the sensor mat for receiving signals representing an occupancy of the vehicle seat and configured to output a occupant detection or classification result;

a temperature sensor disposed on or in a vicinity of the control unit and connected to the control unit, the temperature sensor outputting a measured temperature signal to the control unit representing a current temperature of the foam core of the vehicle seat.

In accordance with an added feature of the invention, the temperature sensor is packaged in a plastics enclosure having a given heat transfer coefficient and heat capacity. The two parameters may be equated to their electrical equivalents resistance (R) and capacitance (C). They define the behavior of the plastics material-enclosed device in relation to the foam.

In accordance with an additional feature of the invention, the given heat transfer coefficient and the heat capacity of the plastics enclosure is substantially identical to a heat transfer coefficient and heat capacity of the foam core. That is, the combination of the two parameters (i.e., RC) of the plastics enclosure is substantially identical to the combination of the two parameters of the foam core.

In accordance with another feature of the invention, the temperature sensor and the control unit are commonly packaged in a plastics enclosure. Preferably, the plastics enclosure is an overmold formed with a thermoplastic material.

In accordance with a further feature of the invention, the temperature sensor is a plurality of thermistors disposed on the control unit.

In accordance with a preferred embodiment, the sensor mat contains a grid of a multiplicity of resistance elements respectively connected to the control unit.

With the above and other objects in view there is also provided, in accordance with the invention, a motor vehicle occupant detection or classification method, which comprises:

providing a plurality of pressure sensors strategically distributed about a seating surface of a motor vehicle seat formed with a resilient core having a temperature-dependent spring behavior;

measuring whether or not at least one of the pressure sensors has been depressed or measuring a weight distribution on the seating surface with the pressure sensors and outputting one or more pressure signals;

measuring a temperature of the resilient core at a location other than a location in the resilient core directly underlying the seating surface;

processing the one or more pressure signals in dependence on a measured temperature and generating therefrom an occupant classification result for further processing.

In accordance with a concomitant feature of the invention, the temperature of the foam core is measured with a temperature sensor disposed at or on the control unit and further processing includes adjusting the occupant safety system of the vehicle in accordance with the occupant classification result.

In other words, the basic concept of the invention is to package the temperature sensors such that they experience almost the same temperatures as the foam, independent on the measuring location in the foam. This is made possible in that the temperature sensors are packaged in a material that represents the temperature behavior of the entire foam. The temperature of the sensors then approximately corresponds to the temperature in the middle of the foam, and it is not influenced by external local heating.

In accordance with a preferred embodiment of the invention, the sensor packaging material is the same as the housing of the electronics, or the temperature sensors are commonly packaged together with the control unit. It is a further advantageous benefit that the temperature sensors are protected by the packaging material against mechanical damage.

Primary advantages of the invention include the following:

The assembly enables robust temperature measurements (mechanical);

Temperature measurement corresponds to the temperature of the foam;

Temperature measurement is possible at or with the electronics, which leads to short lines and improved EMC-behavior;

Position of the temperature sensors in the foam need not be in the center of the foam pad.

Other features which are considered as characteristic for the invention are set forth in the appended claims.

Although the invention is illustrated and described herein as embodied in a system and a method for temperature measurement in automobile seats, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
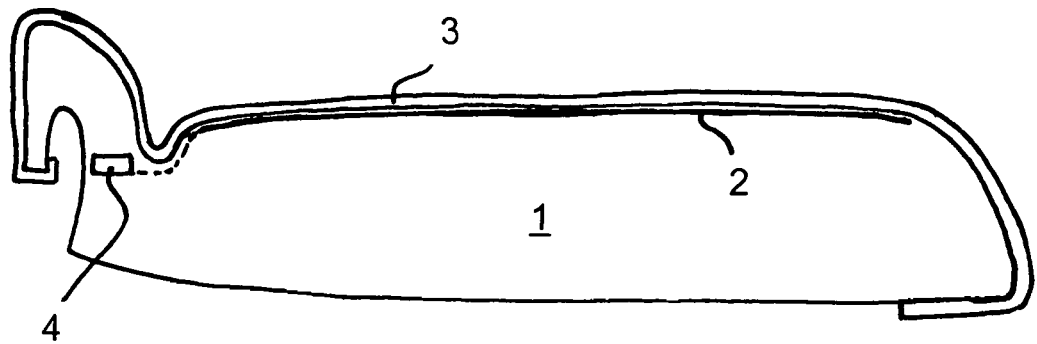
FIG. 1 is a longitudinal section through a motor vehicle seat.
Figure 2:
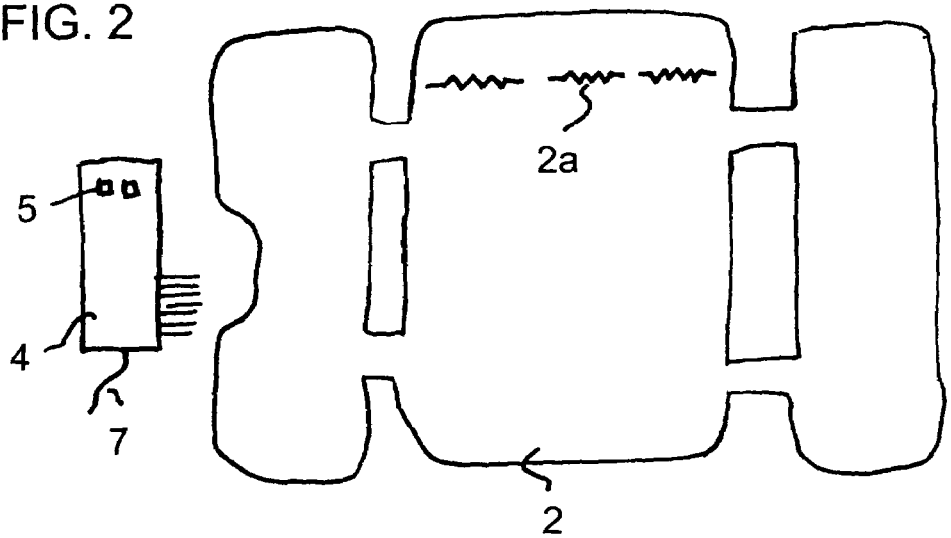
FIG. 2 is a plan view onto a seat sensor mat and a control unit, together forming the primary components of an occupant classification system.

Referring now to the figures of the drawing in detail and first, particularly, to FIG. 1 thereof, there is seen a longitudinal section through a motor vehicle seat equipped with an occupant classification system according to the invention. The primary substrate of the seat is formed by a foam core 1. A sensor mat 2 covers a large portion of the horizontal top surface of the foam core 1. The seat is covered with a trim 3, which may be, for example, fabric, leather, vinyl, artificial leather, or the like. The sensor mat 2 contains a multiplicity of sensors 2a (e.g., 40-70 sensors) that are connected to provide their output signals to a control unit 4. Only a few of the sensors 2a are illustrated in FIG. 2.

In a preferred embodiment of the invention, the sensors are resistance elements whose resistance decreases when they are compressed. That is, their resistance value is greatest when the seat is not loaded, and their resistance value becomes smaller as the load on the trim 3 increases. The sensors are strategically distributed in a grid and, accordingly, the set of resistance values received by the control unit 4 (here: "electronics") thus provides information as to the shape (i.e., the seating foot print) and the weight of the person or other object on the trim.

The control unit 4 is able to calculate, from the signal information received from the sensor mat 2, useful information concerning the occupancy of the vehicle seat. The control unit 4 may be programmed to process and calculate "distribution images" and to conclude therefrom the required classification. It is also possible to compare a currently measured "distribution image" with a number of stored images and to select the one stored image that most closely resembles the measured image.

The sensor measurement values, however, are not absolute. As noted above, they are temperature-dependent due to two primary reasons. First, the foam insert 1 is stiffer at cold temperatures and thus provides more resistance to depression than when it is warm. As the foam resists depression, the same weight results in a higher resistance value "reported" by the respective sensor(s), than when the foam freely gives and does not provide the same amount of counter-pressure on the respective sensor(s). Second, the sensor mat 2 does not bend as easily when it is cold and, as a consequence, the resolution or separation between the individual sensors is not as great. When the sensor mat 2 is warm, it will more easily bend.

This temperature-dependency, then, is the reason for measuring the temperature of the seat and, specifically, the temperature of the foam insert 1. According to the invention, the temperature of the foam is measured by sensing the temperature variations directly at the control unit 4. Temperature sensors 5 are mounted on or at the control unit 4, or they are disposed adjacent the control unit 4. It has been found, quite surprisingly, that the temperature information obtained from the sensors—implemented as a thermistor 5 and a redundant thermistor 5 in the exemplary embodiment—is representative of the temperature in the core of the foam insert 1, if the thermistors 5 are packaged with a material that has a heat transfer coefficient and a heat capacity which results in a heat transfer and a heat capacity of the package that is equal or similar to that of the foam core. As noted above, the electrical equivalent of the two parameters "heat transfer coefficient" and "heat capacity" are resistance R and capacitance C. The package enclosure, according to the invention, should have a combination of the parameters (RC) that resembles the combination of these same parameters of the foam core. The temperature behavior of the foam and of the temperature sensor (the "electronics temperature") will be discussed in the following with reference to FIG. 4 and the comparative illustration in FIG. 5.

The control unit 4 and the temperature sensor 5 are placed at a location other than a location in the foam core directly underlying the seating surface. Here, the temperature measurement by way of the sensors 5 is effected away from the center of the foam core and, specifically, outside a vertical projection of the seating surface.

Figure 3:
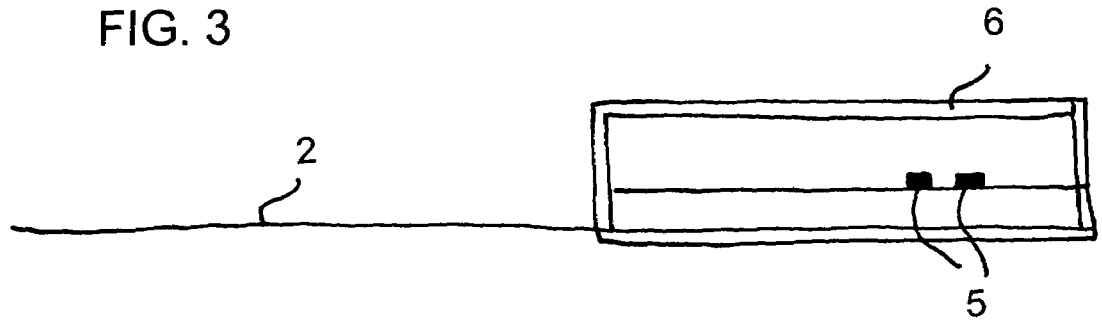
FIG. 3 is a schematic diagram illustrating an exemplary embodiment of the classification system control unit and the sensor mat.

Referring now to a preferred embodiment illustrated in FIG. 3, the control unit 4 and the temperature sensor, in the form of two thermistors 5, are commonly packaged in a plastics housing 6. By way of example, a thermoplastic injection melt such as a copolyamide, commercially available from Huntsman® under the designation TS 03413 is a suitable material. The material can be overmolded to completely encapsulate the control unit and the temperature sensors. By way of example, such an enclosure would be a block with a package dimension of approximately 75 mm×35 mm×15 mm. The control unit 4 is connected to the motor vehicle passenger safety control system via a cable 7.

Figure 4:
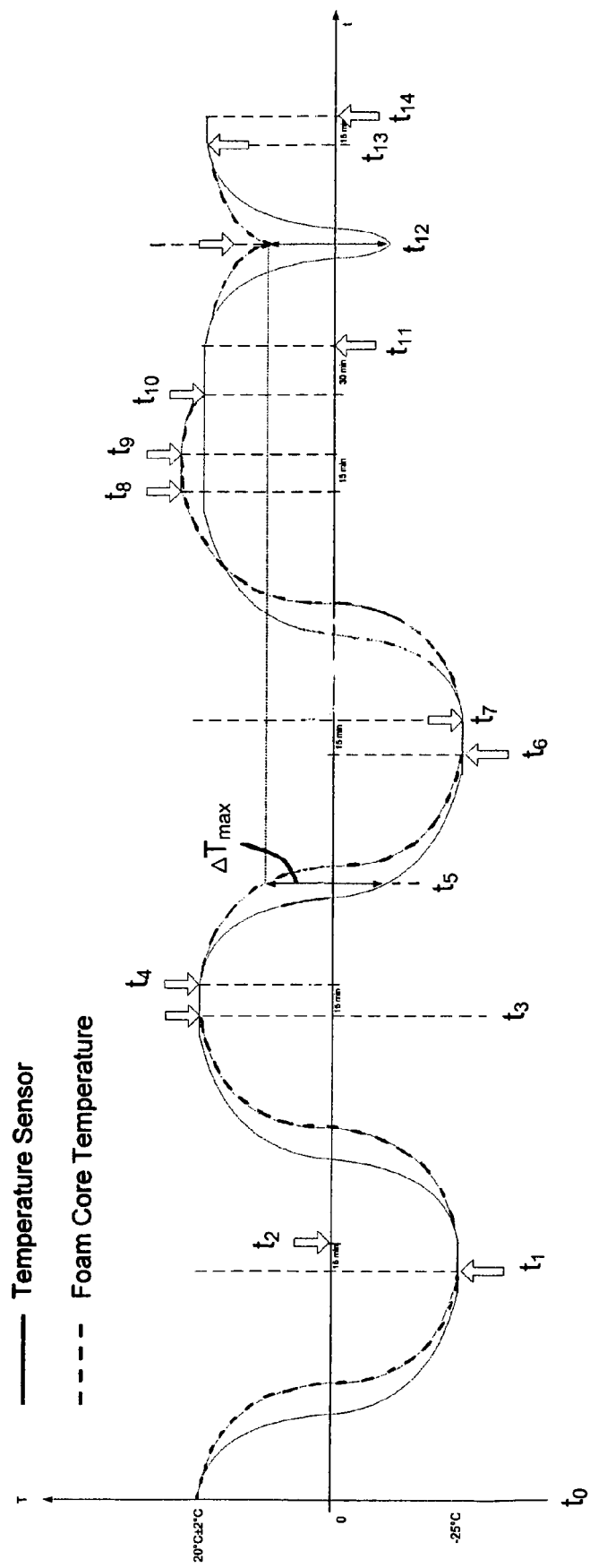
FIG. 4 is a diagram graphing the foam temperature and the temperature of the temperature sensors (electronics temperature) with reference to a variety of different external temperature influences.

Referring now to FIG. 4, there is shown a diagram in which the foam temperature and the temperature of the temperature sensors (electronics temperature) can be seen under different external temperature influences. The foam temperature follows the electronics temperature very closely. The phase shift would be much greater without material block around the temperature sensors. As will become obvious from the following detailed description, the behavior of the system could be yet further improved if the heat transfer coefficient or the heat capacity of the material encasing the temperature sensors were increased.

Beginning on the left of the diagram in FIG. 4, and starting at a time to, the motor vehicle heater is off and no passenger or other source of heat is present on the seat. The vehicle is now exposed from an approximate ambient temperature T=20° C. to very cold ambient temperature of T=−20° C. After a given time period, at a time $t_1$, the foam core temperature and the electronics temperature reach the low ambient temperature. As is clearly visible, the foam temperature follows the electronics temperature quite closely.

At a time $t_2$, the motor vehicle heater is on at 5% power. A person sits down on seat and initially turns the heater on to full power. At a later time, the heater is turned back to "comfortable temperature" at about 20° C.±2° C.

At a time $t_3$ the foam temperature and the electronics temperature reach the internal ambient temperature of 20° C.±2° C. The foam temperature and electronics temperature remain at that level, until the person turns the heater off and leaves the vehicle at a time $t_4$.

After a certain amount of time, which corresponds approximately to the time period between the times $t_0$ and $t_1$, the temperatures once more reach the low exterior ambient temperature −25° C.±2° C. at a time $t_6$. Again, the foam temperature and the electronics temperature mirror each other quite closely, with a maximum T-Delta (i.e., temperature difference ΔT) occurring at a time $t_5$ approximately centrally between $t_4$ and $t_6$.

At a time $t_7$, the motor vehicle heater is on at 5% power. A person sits down on seat and initially turns the heater on to full power. At a later time, the heater is turned back to "comfortable temperature" at about 20° C.±2° C. In addition, the seat heater is turned on with full heating power. At a time $t_8$ the foam temperature and the electronics temperature reach their terminal values. At a time $t_9$, the seat heater is turned off and the person gets out of the vehicle. The foam temperature now settles down to the interior ambient temperature T=20° C.±2° C. at the time $t_{10}$. While the interior temperature of the vehicle remains constant at the comfortable level, the foam temperature and the electronics temperature remain at the same level, which corresponds with T=20° C.±2° C.

When the vehicle heater is turned off at a time $t_{11}$, the foam temperature and the electronics temperature decrease.

Just as the maximum temperature difference $\Delta T_{max}$ is reached at a time $t_{12}$—the exact moment in time was predicted from prior measurements—the motor vehicle heater is on at 5% power, a person sits down on the seat and initially turns the heater on to full power. At a later time, the heater is turned back to "comfortable temperature" at about 20° C.±2° C.

At this time, both the electronics temperature and the foam temperature begin to rise once more until they reach the internal ambient temperature set by the user at a time $t_{13}$. Shortly thereafter the experiment was terminated at a time $t_{14}$.

Figure 5:
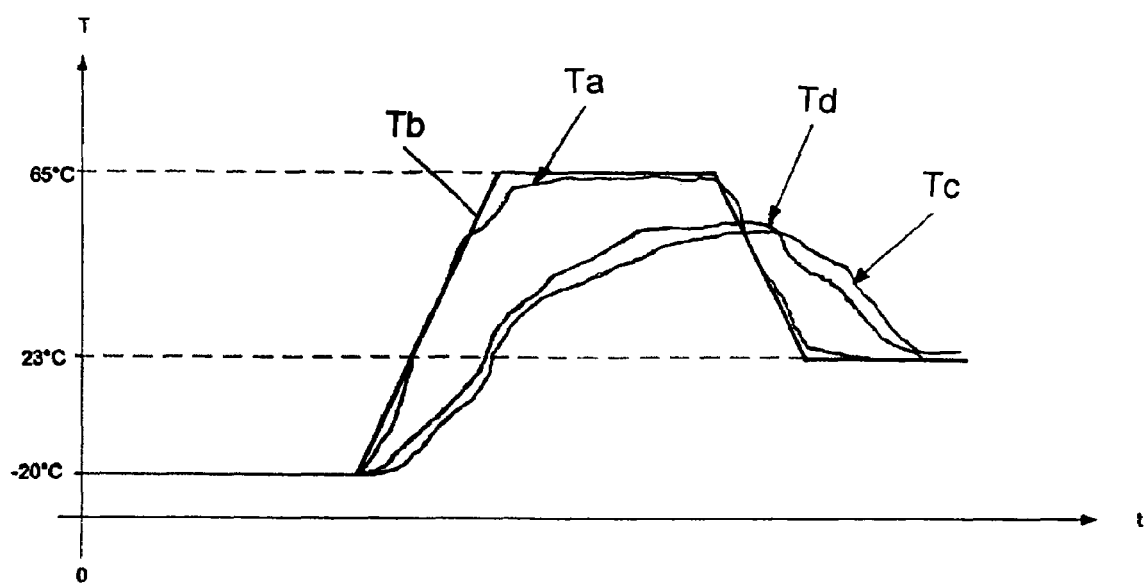
FIG. 5 is a comparative graph illustrating the behavior of a sensor according to the invention and a sensor that is not provided in accordance with the invention.

With reference to FIG. 5, an unpackaged temperature sensor does not provide as useful a signal as the packaged sensor according to the invention. The temperature readings $T_a$ obtained with an unpackaged sensor follow the "ambient" temperature cycle $T_b$ very closely. The ambient temperature cycle $T_b$, however, is not reflected by the foam temperature $T_c$. Instead, the foam temperature $T_c$ lags the ambient temperature in its time behavior and also does not readily reach the same temperature level. This is likely due to the heat capacity of the foam. The temperature readings $T_d$ obtained from the packaged temperature sensor according to the invention, however, follows the foam temperature $T_c$ very closely. The likely reason for this is that the combination of the heat capacity and heat transfer of the thermoplastic mold casing surrounding the temperature sensor is similar to the combination of these parameters of the foam.

We claim:

1. In combination with a vehicle seat, an occupant detection or classification system for the vehicle seat, the occupant detection or classification system comprising:
    a sensor mat disposed on, in, or below a foam core of the vehicle seat;
    a control unit connected to said sensor mat for receiving signals representing an occupancy of the vehicle seat and configured to output an occupant detection or classification result;
    a temperature sensor disposed on or in a vicinity of said control unit and connected to said control unit, said temperature sensor outputting a measured temperature signal to said control unit representing a current temperature of the foam core of the vehicle seat; and
    a material packaging said temperature sensor;
    said material having a given heat transfer coefficient representing a heat transfer coefficient of the foam core, and said material having a given heat capacity representing a heat capacity of the foam core; and
    said temperature sensor disposed in the foam core of the vehicle seat.

2. The occupant detection or classification system according to claim 1, further comprising a plastics enclosure packaging said temperature sensor and said control unit.

3. The occupant detection or classification system according to claim 1, further comprising a plastics enclosure packaging said temperature sensor, wherein said material is a thermoplastic material, and said plastics enclosure is an overmold formed with said thermoplastic material.

4. The occupant detection or classification system according to claim 1, wherein said temperature sensor is a plurality of thermistors disposed on said control unit.

5. The occupant detection or classification system according to claim 1, wherein said sensor mat contains a grid of a multiplicity of resistance elements respectively connected to said control unit.

6. The occupant detection or classification system according to claim 1, wherein said material forms a plastics enclosure.

7. The occupant detection or classification system according to claim 1, wherein the given heat transfer coefficient is substantially identical to a heat transfer coefficient of the foam core, and the given heat capacity is substantially identical to a heat capacity of the foam core.

8. The occupant detection or classification system according to claim 7, wherein said material forms a plastics enclosure.

9. The occupant detection or classification system according to claim 1, wherein said material has a temperature response simulating a temperature response of the foam core of the vehicle seat.

10. An occupant detection or classification system for a vehicle seat, comprising:
    a sensor mat disposed on, in, or below a foam core of the vehicle seat;
    a control unit connected to said sensor mat for receiving signals representing an occupancy of the vehicle seat and configured to output an occupant detection or classification result;
    a temperature sensor disposed on or in a vicinity of said control unit and connected to said control unit, said temperature sensor outputting a measured temperature signal to said control unit representing a current temperature of the foam core of the vehicle seat; and
    a plastics enclosure packaging said temperature sensor;
    said plastics enclosure having a given heat transfer coefficient being substantially identical to a heat transfer coefficient of the foam core, and said plastics enclosure having a given heat capacity being substantially identical to a heat capacity of the foam core.

11. A motor vehicle occupant detection or classification method, which comprises:
    providing a plurality of pressure sensors strategically distributed about a seating surface of a motor vehicle seat formed with a resilient core having a temperature-dependent spring behavior;
    providing a temperature sensor packaged in a material having a given heat transfer coefficient being substantially identical to a heat transfer coefficient of the resilient core and having a given heat capacity being substantially identical to a heat capacity of the resilient core;
    disposing the temperature sensor at a location other than a location in the resilient core directly underlying the seating surface;
    measuring a pressure or a weight distribution on the seating surface with the pressure sensors and outputting at least one pressure signal;
    measuring a temperature representing a temperature of the resilient core with the temperature sensor;
    processing the pressure signals in dependence on a measured temperature and generating therefrom an occupant detection or classification result for further processing.

12. The occupant classification method according to claim 11, which comprises disposing the temperature sensor at or on a control unit for processing the pressure signals and wherein further processing includes adjusting an occupant safety system of the vehicle in accordance with the occupant detection or classification result.

13. An occupant detection or classification system for a vehicle seat, comprising:
    a sensor mat disposed on, in, or below a foam core of the vehicle seat;
    a control unit connected to said sensor mat for receiving signals representing an occupancy of the vehicle seat and configured to output an occupant detection or classification result;
    a temperature sensor disposed on or in a vicinity of said control unit and connected to said control unit, said temperature sensor outputting a measured temperature signal to said control unit representing a current temperature of the foam core of the vehicle seat; and
    a material packaging said temperature sensor;
    said material having a given heat transfer coefficient being substantially identical to a heat transfer coefficient of the foam core, and said material having a given heat capacity being substantially identical to a heat capacity of the foam core.

14. The occupant detection or classification system according to claim 13, further comprising a plastics enclosure packaging said temperature sensor and said control unit.

15. The occupant detection or classification system according to claim 13, further comprising a plastics enclosure packaging said temperature sensor, wherein said material is a thermoplastic material, and said plastics enclosure is an overmold formed with said thermoplastic material.

16. The occupant detection or classification system according to claim 13, wherein said temperature sensor is a plurality of thermistors disposed on said control unit.

17. The occupant detection or classification system according to claim 13, wherein said sensor mat contains a grid of a multiplicity of resistance elements respectively connected to said control unit.

* * * * *